United States Patent [19]
Blain et al.

[11] Patent Number: 5,759,143
[45] Date of Patent: Jun. 2, 1998

[54] FITMENT APPLICATOR

[75] Inventors: Gerald M. Blain, Los Gatos; Reynaldo F. Medel, Milpitas, both of Calif.

[73] Assignee: Portola Packaging, Inc., San Jose, Calif.

[21] Appl. No.: 740,761

[22] Filed: Nov. 1, 1996

[51] Int. Cl.[6] .................................................. B31B 3/84
[52] U.S. Cl. ........................ 493/87; 53/133.2; 53/133.4
[58] Field of Search .......................... 493/87; 53/133.2, 53/133.3, 133.4; 156/580.1

[56] References Cited

U.S. PATENT DOCUMENTS

| | | | |
|---|---|---|---|
| 4,566,928 | 1/1986 | Rausing | 156/217 |
| 4,604,850 | 8/1986 | Reil | 53/423 |
| 4,788,811 | 12/1988 | Kawajiri et al. | 53/426 |
| 4,909,434 | 3/1990 | Jones et al. | 229/125.15 |
| 4,964,562 | 10/1990 | Gordon | 229/125.15 |
| 5,058,360 | 10/1991 | Yamazaki et al. | 53/133.2 |
| 5,174,465 | 12/1992 | Luch et al. | 220/288 |
| 5,203,819 | 4/1993 | Gleason | 53/133.2 |
| 5,219,320 | 6/1993 | Abrams | 493/8 |
| 5,249,695 | 10/1993 | Luch et al. | 220/276 |
| 5,267,934 | 12/1993 | Pape | 493/87 |
| 5,272,855 | 12/1993 | Togi et al. | 53/410 |
| 5,304,265 | 4/1994 | Keeler | 156/64 |
| 5,366,433 | 11/1994 | McCormick | 493/87 |
| 5,435,803 | 7/1995 | Owen | 493/87 |
| 5,484,374 | 1/1996 | Bachner | 493/87 |
| 5,601,669 | 2/1997 | Moody | 493/87 |

FOREIGN PATENT DOCUMENTS

| | | | |
|---|---|---|---|
| 2 645 503 | 4/1989 | France | B65D 5/74 |

OTHER PUBLICATIONS

Video tape of machine furnished by assignee in use more than 1 year prior to Oct. 15, 1992. Filed in Serial No. 08/137,954, filed Oct. 15, 1993.

*Primary Examiner*—Jack W. Lavinder
*Attorney, Agent, or Firm*—Julian Caplan Flehr Hohbach Test Albritton & Herbert LLP

[57] ABSTRACT

A fitment attachment apparatus installed at a station along a filler line is substantially completely mounted on a single casting attached to the bed of the machine. As an open upper end, apertured panel carton is conveyed to the station, a rotary anvil having spuds on which fitments are applied lowers a fitment inside the carton. The anvil is moved axially so that the spout end of the fitment extends out through the aperture in the carton panel and a peripheral flange on the opposite end of the fitment engages the inside of the aperture panel. The anvil shaft carries a driven sprocket on one end which is connected by a side-flex chain to a drive sprocket which turns in timed relation to the intermittent carton conveyor chain. The sleeve on which the anvil is mounted is indexed into precise angular position by an apertured collar fixed to the anvil sleeve mating with a stationary pen. Hence the fitment is accurately located in line with the carton despite flexing of the drive chain.

5 Claims, 6 Drawing Sheets

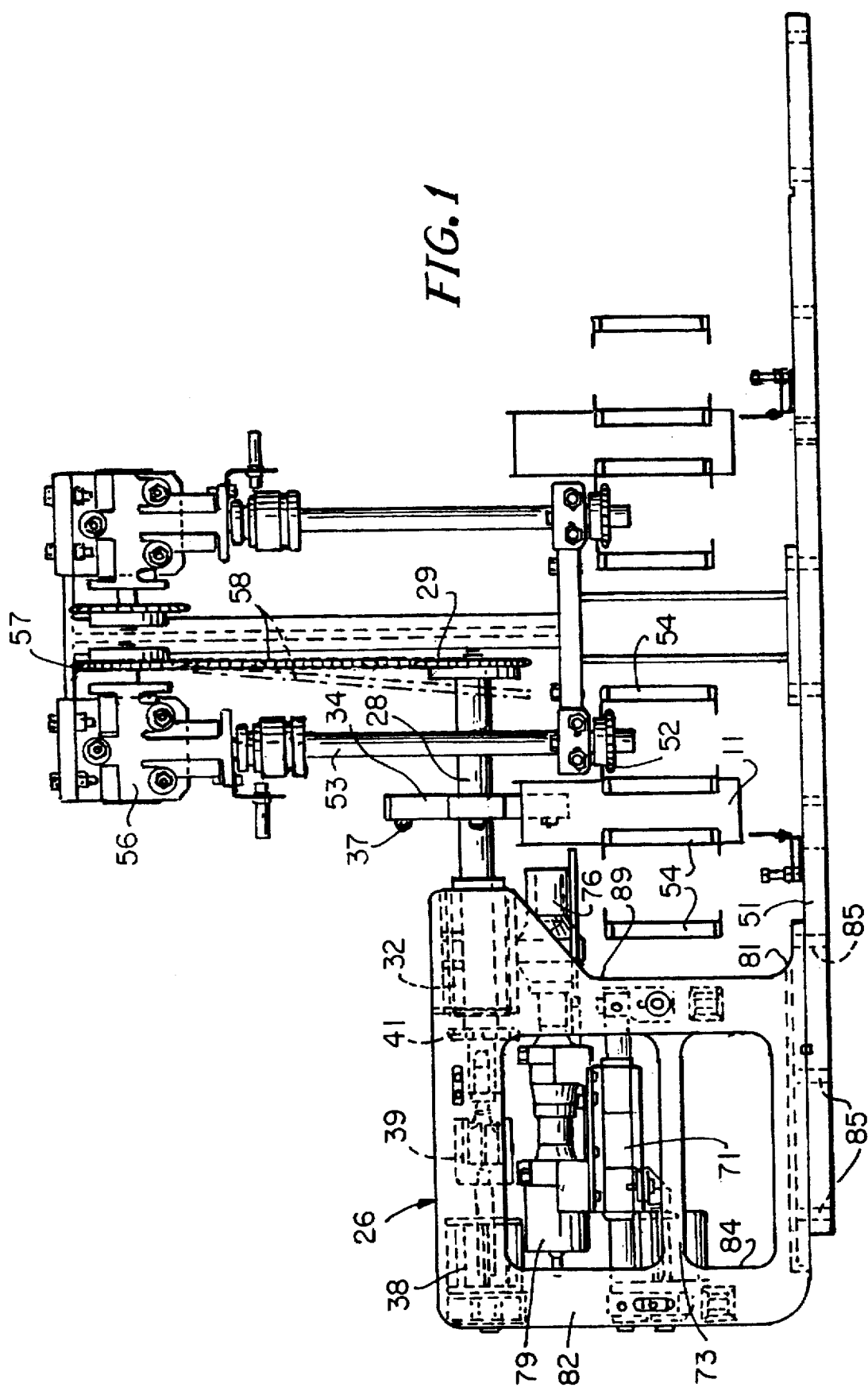

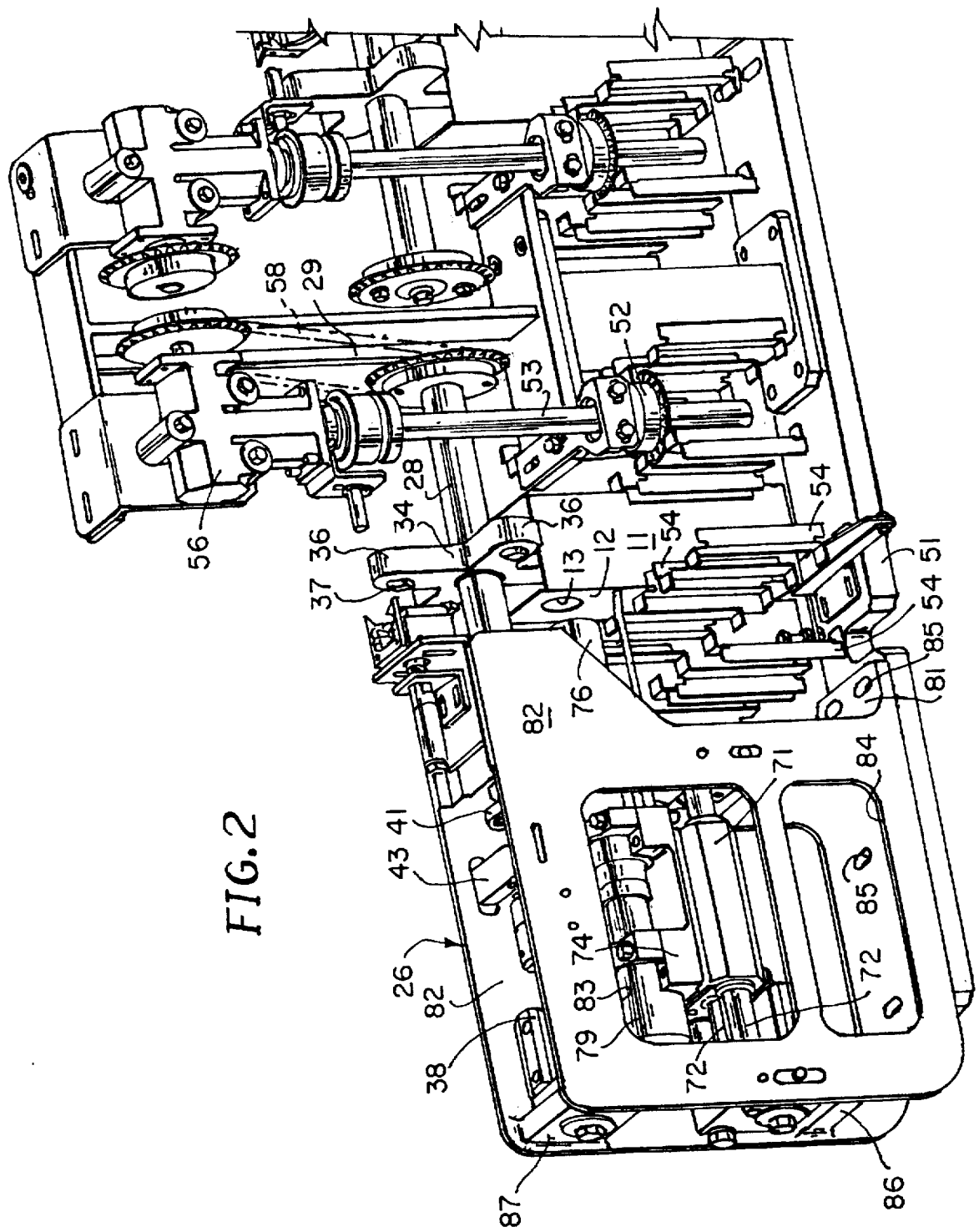

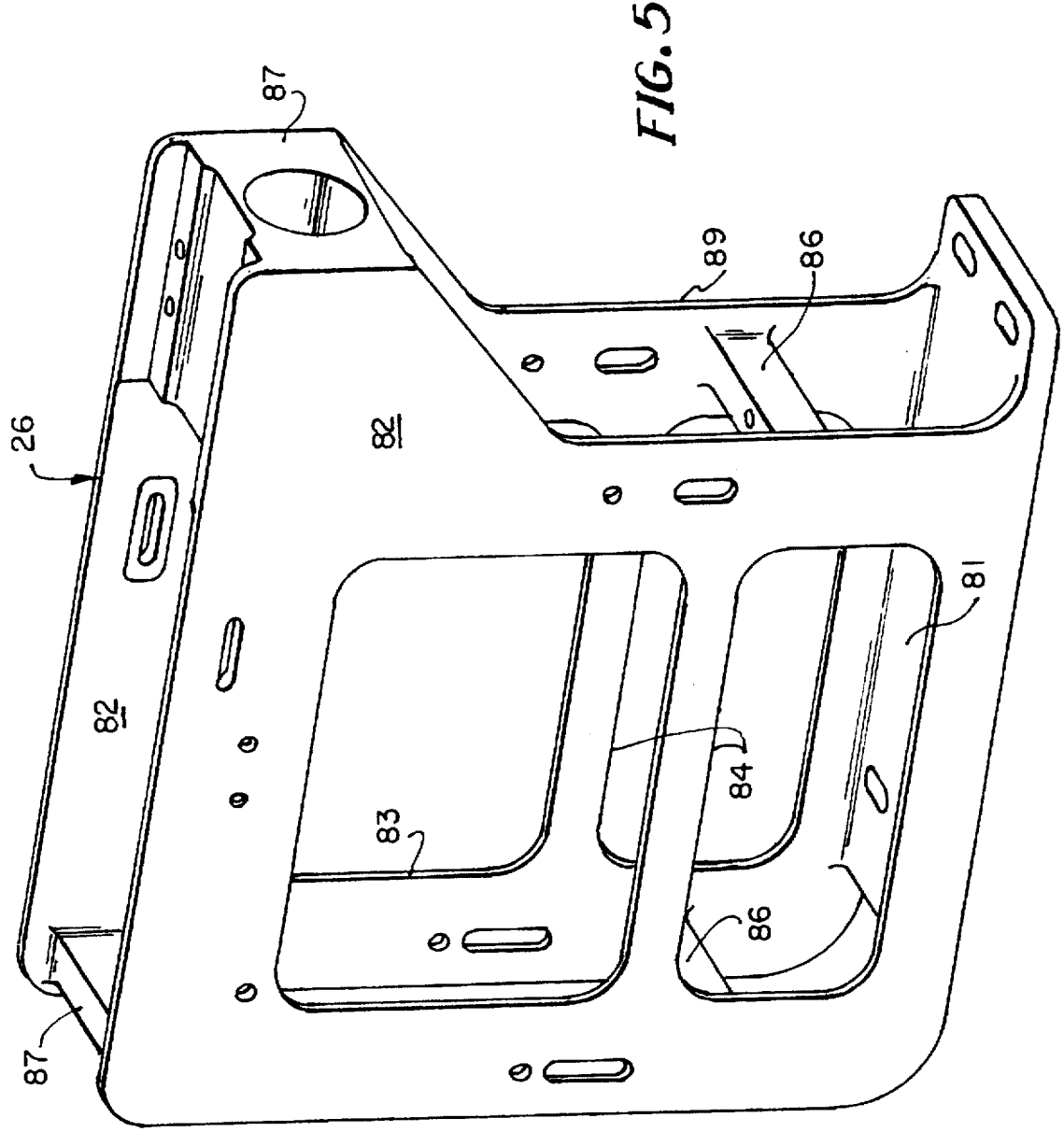

FITMENT APPLICATOR

BACKGROUND OF THE INVENTION

1. Field of the Invention

This invention relates to a new and improved device for a fitment application machine and to the method of operation thereof. More particularly, the invention relates to means for such a machine wherein an axially reciprocating shaft is driven in timed relation to the intermittent carton conveyor drive by a flexible chain driving the main shaft of the applicator and further to means for accurately positioning the main shaft and the fitment carried thereby relative to the carton and to the welding horn of the application machine.

2. Description of Related Art

Fitments of the type of the present invention are subject to wide variation. Preferred fitments are shown in U.S. Pat. Nos. 5,174,465; 5,249,695; 5,271,519; 5,303,837; 5,348,184 and in U.S. patent application Ser. No. 08/380,832 filed Jan. 30, 1995. Such fitments are inserted into the inside of an open ended carton formed with an aperture in one panel thereof and are moved horizontally so that the spout end of the fitment projects through the hole in the carton. Whereupon a welding head is applied to the exterior of the carton to weld an internal flange of the fitment to the carton. Such a machine is illustrated and described in Bachner U.S. Pat. No. 5,484,374.

SUMMARY OF THE INVENTION

Fitments used with the present invention are subject to considerable variation. Essentially, such fitments have a peripheral flange at one end and a spout projecting upwardly thereof and are usually closed with a cap. The structure of such fitment is subject to wide variation. A preferred fitment is shown in U.S. patent application Ser. No. 08/380,832 filed Jan. 30, 1995, but it will be understood that many other fitments may be used. The fitment is applied to a conventional tent type carton having a top panel formed with an aperture dimensioned so that the fitment 21 fits the fitment projects outward from the interior of the carton through the aperture and the flange is welded to the interior thereof.

Standard filling machines advance cartons intermittently horizontally in line on a conveyor from a carton depositing station (which may be preceded by a carton setup station), thence through the fitment application station which comprises the present invention and thence to filling and closing stations. As the cartons move toward the application station, they are advanced on a conveyor, which again is subject to wide variation in structure, substantially horizontally. Fitments are delivered from a hopper to a chute which leads to a fitment box on the top of the present station. Extending transversely of the direction of movement of the conveyors is a horizontally reciprocable shaft positioned perpendicular to the direction of movement of the cartons. Mounted on the shaft is an anvil having radially projecting arms on the outer end of each of which is a spud. When a spud is uppermost, a fitment is deposited thereon from the fitment box and is carried down as the shaft rotates in timed relation to the movement of the conveyor until the fitment is deposited inside the open end of the carton substantially in alignment with the hole in the carton panel. Thereupon the anvil reciprocates so that the spout of the fitment is projected out through a hole in a carton panel. A welding head engages the exterior of the carton and the flange of the fitment is clamped between the anvil and the welding horn until a weld of the flange of the fitment to the carton is completed preferably ultrasonically. The anvil is then reciprocated away from the carton panel as is the welding horn and as the anvil rotates the carton proceeds along the conveyor to the filling and closing stations.

The present invention relates to a device which drives the aforementioned shaft by a flexible chain from a drive sprocket which turns as the carton conveyor moves.

A still further alignment feature is the use of a pin fixed relative to the frame of the machine which engages a hole in an apertured disk which rotates with the anvil and aligns the spud carrying the fitment in a vertically downmost position so that it is exactly at the level of the hole in the carton, despite the fact that the flexible drive chain may not otherwise accurately align the fitment.

Accordingly it is a principal purpose and advantage of the present invention to accurately position the fitment and carton relative to each other so that accurate welding of the fitment is accomplished.

By reason of the fact that all of the necessary elements are accurately aligned, the present invention enables the application station of the machine to be operated more rapidly.

Still another feature of the invention is the fact that improper welds of the fitment to the carton are decreased.

An advantage of the present invention is the fact that a support, such as a bearing is not required on the outer end of the shaft which carries the anvil. Accordingly, the possibility of lubricant from the bearing contaminating the cartons therebeneath is avoided.

DESCRIPTION OF THE DRAWINGS

The accompanying drawings, which are incorporated in and form a part of this specification, illustrate embodiments of the invention and, together with the description serve to explain the principles of the invention.

FIG. 1 is a side elevational view of the fitment application station.

FIG. 2 is a perspective view of a portion of the structure of FIG. 1.

FIG. 5 is an enlarged perspective view of the frame of the attachment station prior to installation of parts to be mounted thereon.

DESCRIPTION OF PREFERRED EMBODIMENT

Figure 1A:
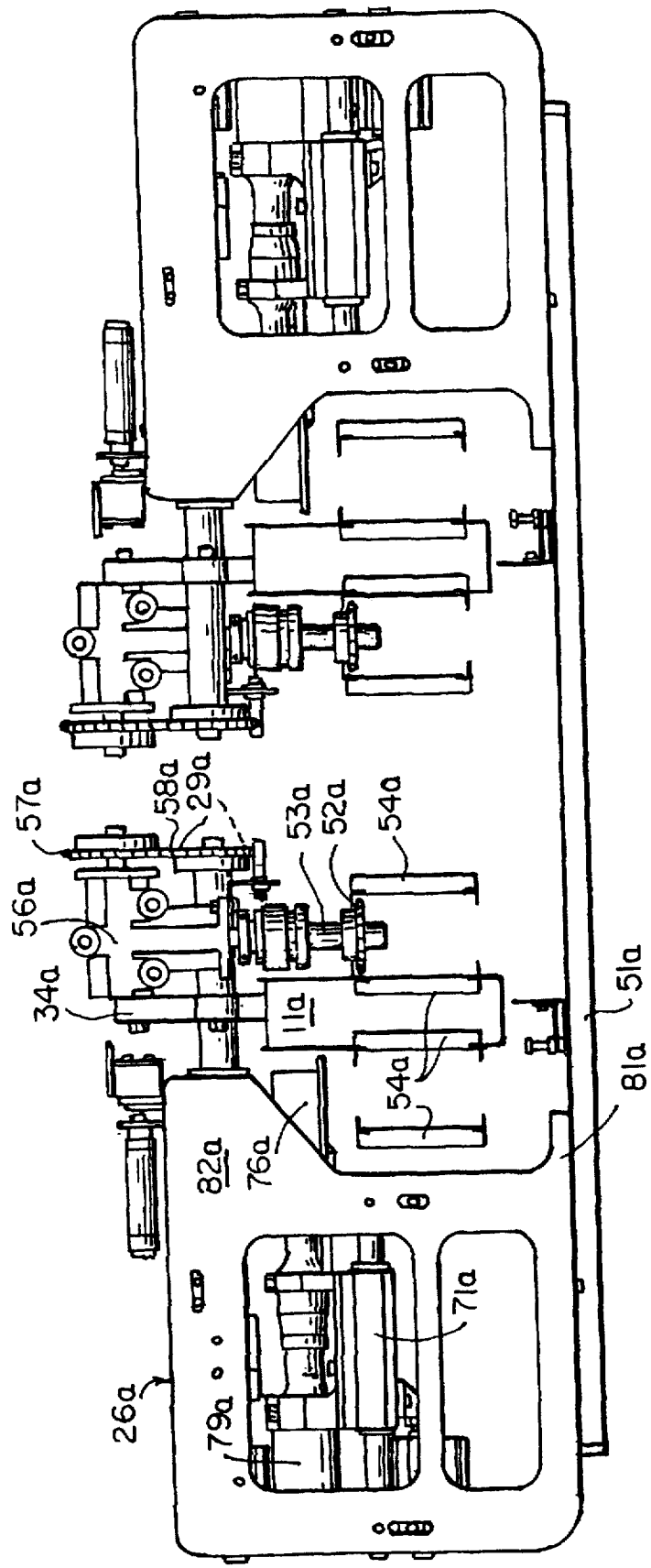
FIG. 1A is a view similar to FIG. 1 of a modification.
Figure 3:
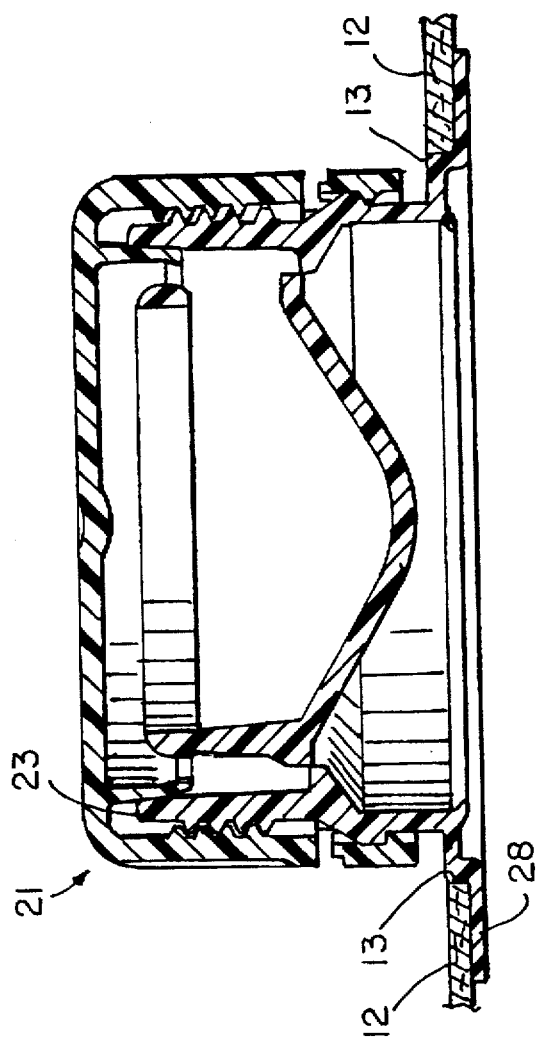
FIG. 3 is a fragmentary sectional view of a fitment which may be used with he invention and a portion of a carton to which the fitment is attached.
Figure 4:
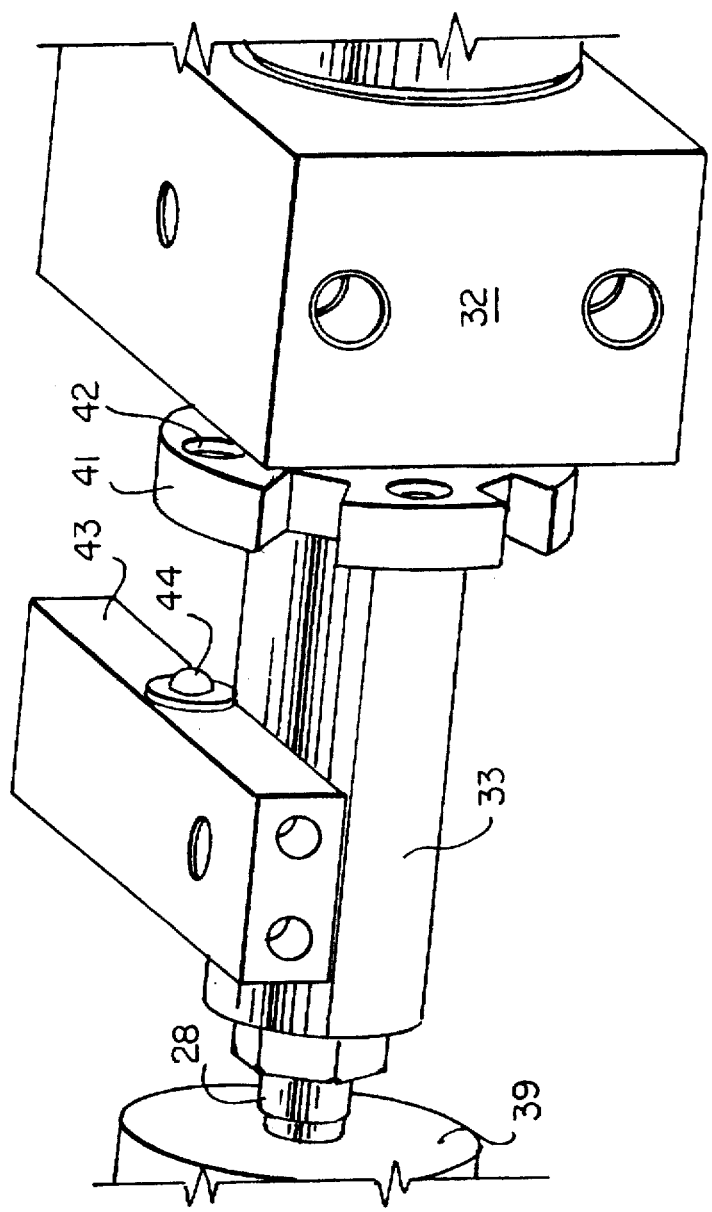
FIG. 4 is an enlarged perspective view of the anvil shaft and associated parts.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Carton 11 is of a coated paperboard stock having a square cross-section and, at the application station, having an open top. Panel 12 thereof on one side of carton 11 is formed with an aperture 13. At right angles to the panel 12 are leading and trailing sides 14 and 16, respectively.

Fitment 21, as well as carton 11, are subject to wide variation in structure. As illustrated, fitment 21 has a peripheral flange 22 at one end and a spout 23 projecting outwardly thereof dimensioned so that the spout 23 fits through aperture 13 and the flange 22 engages the inside of panel 12 surrounding aperture 13.

The application station is illustrated in the accompanying drawings. As shown, there is a vertical frame 26 and a horizontal frame projecting from the lower edge of frame 26. Mounted horizontally near the top of frame 26 is a rotating and reciprocable shaft 28. At one end of shaft 28 is a sprocket 29 which is driven by means not illustrated but well understood in this art, in timed relation to the intermittent movement of the conveyor (partially shown) which conveys the cartons 11 to the application station. Shaft 28 is supported by inner bearing block 32 attached to frame 26. Mounted on shaft 28 is an anvil 34 having preferably four radial arms 36 on the outer ends of each of which is a spud 37. At the end of shaft 28 opposite sprocket 29 is an air cylinder 38 keyed to a coupler 39 which causes shaft 28 to reciprocate horizontally, preferably when shaft 28 is stationary.

Mounted on shaft 28 is an index disk 41 having four holes 42 corresponding to arms 36. Mounted on frame 26 is a horizontally disposed stationary block 43 which has a locating pin 44 formed with a rounded outer end. When the anvil 34 reciprocates to the right as viewed in FIG. 1, pin 44 enters one of the holes 42 and accurately aligns the spud 37 carrying a fitment 21 (not shown in FIG. 1) in downmost vertical position and in accurate alignment with the hole 13 in carton 11.

Fitments 21 are conveyed from a source not shown but well known in this art down a chute 46 of well known construction to a fitment box 47 where they are fed out one at a time by cylinder 48 onto the spud 37 which is uppermost at the particular time. The fitment is held on the spud as the anvil 34 reciprocates away from the box 47 and the next fitment falls into place in box 47. Intermittent rotation of shaft 28 carries the fitment to vertically downmost position inside carton 11.

Likewise mounted on frame 26 is a welding carriage 71 which reciprocates horizontally with respect thereto on way shafts 72 mounted on frame 26. Carriage 71 is caused to reciprocate horizontally by cylinder 73 mounted on frame 26. Projecting from carriage 71 is a horn support 74 on which is located a welding horn 76 (preferably ultrasonically activated by activator 79).

Conveyor bed 51 extends inwardly relative to frame 26 and supports the bottom of carton 11 during a considerable part of the travel of the carton. Horizontal intermittently rotated sprocket 52 is part of the drive for the carton conveyor, much of which is not illustrated in the accompanying drawings nor described herein because it is subject to wide variation and is generally well understood in this art. Conveyor lugs 54 engage the carton 11 and advance intermittently along the path of travel, said lugs being driven by horizontal conveyor chains (not shown) which engage sprocket 52. The upper end of vertical sprocket shaft 53 to which sprocket 52 is fixed drives a right angle drive 56 which in turn drives sprocket 57. Driven sprocket 29 of shaft 28 is connected to sprocket 57 by side-flex chain 58. One suitable chain is a side bow roller chain, Rex Model 405B.

Directing attention to FIG. 1, the solid line position of chain 58 shows the shaft 28 in position so that anvil 34 is approximately in the middle of carton 11. The anvil 34 subsequently moves to the left in order to advance the fitment held thereon outwardly through the hole 13 in the carton 11, the position of sprocket 29 being thereupon in the dotted line position shown in FIG. 1 and the chain 58 flexing to the dotted line position. By reason of the use of the index disk 41 and locating pin 44, the fitment is accurately positioned despite the flexing of chain 58 and possible mis-positioning of sprocket 29.

Directing attention now to FIG. 5, an improved frame 26 is illustrated which comprises a single casting providing rigidity to all the parts and improving the accurate mounting of the various parts attached to frame 26. Thus a heavy base 81 is formed at the bottom of frame 26, the spaced vertical sides 82 of which are formed with top windowss 83 and bottom window 84 for weight reduction and also for easier access to the parts mounted on frame 26. Bolts 85 accurately and rigidly secure base 81 to the conveyor bed 51.

To prevent flexing of sides 82, transverse connectors 86 are formed at the inner and outer ends approximately midway of the height of the base and transverse, generally vertically disposed, top connectors 87 are likewise formed. By comparison of FIG. 5 with FIG. 1, it will be seen at the various parts of the applicator station are readily mounted to the base 26.

FIG. 1A shows a modified fitment attachment station wherein the length of shaft 53a is considerably reduced and drive sprocket 57a is located in close proximity to sprocket 29a. Hence the chain 58a interconnecting sprockets 57a and 29a is considerably reduced in length. In other respects the structure of FIG. 1A is substantially the same as that of FIG. 1 and the same reference numerals followed by the subscript a are used to designate corresponding parts.

As shown in FIGS. 1A and 2, the present invention may be installed at an application station side by side with a duplicate applicator station of a parallel conveyor line. Since the structures of the two lines are substantially identical, the second line has not been described herein. However, one of the features of the present invention is that the station is so compact that two stations may be thus installed side by side in a dual carton filling machine.

Operation

Cartons 11 having open ends uppermost are advanced substantially horizontally along bed 51 by lugs 54. Prior to arrival of carton 11 at the attachment station, a fitment 21 has been attached to one of the spuds 37 of anvil 34. As the carton approaches the attachment station, the arm 36 carrying the fitment enters the top of the carton 11 so that the spout 23 thereof is in alignment with aperture 13. Shaft 28, anvil 34, and the fitment carried thereby is advanced to the right as viewed in FIG. 1, chain 58 flexing to accommodate the movement. Any tendency of the anvil to misalign relative to the aperture 13 is prevented by reason of locating pin 44 entering an appropriate hole 42 in disk 41. Spout 23 is thus extended out through aperture 13 and flange 22 engages the inside of panel 12. Simultaneously, welding carriage 71 advances toward carton 11 so that horn 76 engages the outside of panel 12 surrounding spout 23. Horn 76 is actuated, preferably by ultrasonic activator 79, causing the flange 22 to be welded to panel 12. Thereupon the various members retract to their initial positions, chain 58 flexing to accommodate the relative movement between sprockets 29 and 57. It will be observed that there is no bearing or other lubricant containing element on the outboard end of shaft 28. Hence tendency for lubricant to contaminate carton 11 is materially reduced.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A fitment applicator for attaching fitments having a peripheral flange at one end and a spout at an opposite end to a paperboard open-ended carton having a panel formed with an aperture comprising a conveyor bed, a conveyor for advancing cartons intermittently along said bed, an unitary frame comprising a horizontal base mounted on said bed having inner and outer ends located adjacent and remote from said conveyor, respectively, first and second spaced apart sides extending perpendicularly up from said base, first and second intermediate transverse connectors between said sides at said inner and outer ends of said base respectively, first and second upper transverse connectors between said sides at said inner and outer ends of said base, respectively, a substantially horizontal shaft mounted on said frame between said sides, said upper transverse connectors being apertured for passage of said shaft therethrough to extend beyond said conveyer, means for rotating said shaft in timed relation to said conveyer, a bearing for said shaft supported by said sides adjacent said first upper transverse connector, means mounted on said base adjacent said second upper transverse connector, said means being arranged to reciprocate said shaft axially, an anvil mounted for rotation with said shaft beyond said first upper transverse connector and over said conveyer, said anvil having a plurality of radial arms, means adjacent an end of each said arm for detachably securing a fitment, a welding carriage reciprocably mounted on said frame between said sides supported by said intermediate transverse connectors, means mounted on said base for reciprocating said carriage toward and away from a carton on said conveyer beneath said shaft, and a welding horn on said carriage.

2. An applicator according to claim 1 in which said sides are formed with cutaways adjacent said conveyor for passage of cartons along said conveyor.

3. An applicator according to claim 1 in which said means for rotating said shaft comprises a sprocket mounted on an end of said shaft remote from said frame and from said conveyor.

4. An applicator according to claim 3 in which said shaft is unsupported between said anvil and said sprocket.

5. An application according to claim 1 which further comprises a disk on said shaft rotatable and reciprocable with said anvil, said disk being formed with holes corresponding to the location of said arms and which further comprises a block stationarily mounted on said frame having a pin positioned to fit in one said hole when said anvil is reciprocated toward said carton panel to accurately align a fitment on an arm of said anvil with an aperture in said carton.

* * * * *